(12) United States Patent
Leong

(10) Patent No.: US 10,506,192 B2
(45) Date of Patent: Dec. 10, 2019

(54) GESTURE-ACTIVATED REMOTE CONTROL

(71) Applicant: GOOGLE INC., Mountain View, CA (US)

(72) Inventor: Jian Wei Leong, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 32 days.

(21) Appl. No.: 15/238,364

(22) Filed: Aug. 16, 2016

(65) Prior Publication Data

US 2018/0054586 A1    Feb. 22, 2018

(51) Int. Cl.
*H04N 5/44*        (2011.01)
*G06F 3/01*        (2006.01)
(Continued)

(52) U.S. Cl.
CPC ........... *H04N 5/4403* (2013.01); *G06F 3/017* (2013.01); *G06F 3/167* (2013.01); *G06K 9/00335* (2013.01); *G10L 15/22* (2013.01); *G10L 25/84* (2013.01); *H04N 5/60* (2013.01); *G10L 2015/223* (2013.01);
(Continued)

(58) Field of Classification Search
CPC ................. H04N 5/4403; H04N 5/60; H04N 2005/4425; H04N 2005/4428; H04N 2005/4423; H04N 21/4126; H04N 21/4204; H04N 21/42206; H04N 21/4207; H04N 21/42208; H04N 21/4209; H04N 21/4221; H04N 21/42219; H04N 21/4222; H04N 21/42222; H04N 21/42224; H04N 21/42225; H04N 21/42226; H04N 21/4223; H04N 21/42215; H04N 21/422; G10L 15/22; G10L 25/84; G10L 2015/223; G06F 3/017;
(Continued)

(56) References Cited

U.S. PATENT DOCUMENTS 9,176,590 B2 * 11/2015 Ivanich ................ H04N 5/4403
9,390,726 B1    7/2016 Smus et al.
(Continued)

FOREIGN PATENT DOCUMENTS

CN      202617260 U    12/2012
CN      104811792 A     7/2015
EP        2613313 A1     7/2013

OTHER PUBLICATIONS

Solanki, et al., "Hand gesture based remote control for home appliances : Handmote", IEEE 2011 World Congress on Information and Communication Technologies, 2011, pp. 425-429, 5 pages.
(Continued)

*Primary Examiner* — Benjamin R Bruckart
*Assistant Examiner* — Tien M Nguyen
(74) *Attorney, Agent, or Firm* — Brake Hughes Bellermann LLP

(57) ABSTRACT

A gesture-based control for a television is provided that runs in the background of a computing device remote from the television, where the control is activated by a gesture. Advantageously, the user need not interrupt any task in order to control the television. The gesture based control can be configured to activate a voice control that will run robustly even in the presence of noise and competing voices emanating from the television.

18 Claims, 6 Drawing Sheets

(51) Int. Cl.
*G06F 3/16* (2006.01)
*G06K 9/00* (2006.01)
*G10L 15/22* (2006.01)
*G10L 25/84* (2013.01)
*H04N 5/60* (2006.01)

(52) U.S. Cl.
CPC ............. *H04N 2005/4423* (2013.01); *H04N 2005/4425* (2013.01); *H04N 2005/4428* (2013.01)

(58) Field of Classification Search
CPC .......... G06F 3/167; G06F 3/048; G06F 3/033; G06K 9/00335; H03J 9/00; H01H 9/0235; H04B 1/205
See application file for complete search history.

(56) References Cited

U.S. PATENT DOCUMENTS

| | | | | |
|---|---|---|---|---|
| 9,417,689 | B1* | 8/2016 | Ramaswamy | G06F 3/01 |
| 2002/0057383 | A1* | 5/2002 | Iwamura | G08C 23/00 |
| | | | | 348/734 |
| 2003/0105637 | A1* | 6/2003 | Rodriguez | G06F 17/2735 |
| | | | | 704/270 |
| 2005/0154588 | A1* | 7/2005 | Janas, III | G06F 19/325 |
| | | | | 704/249 |
| 2006/0203105 | A1 | 9/2006 | Srinivasan | |
| 2010/0333163 | A1 | 12/2010 | Daly | |
| 2011/0134112 | A1 | 6/2011 | Koh et al. | |
| 2015/0036573 | A1 | 2/2015 | Malik et al. | |
| 2015/0149956 | A1* | 5/2015 | Kempinski | G06F 3/017 |
| | | | | 715/784 |
| 2015/0301796 | A1* | 10/2015 | Visser | G06F 3/167 |
| | | | | 715/728 |
| 2017/0060530 | A1* | 3/2017 | Maker, III | G06F 3/167 |

OTHER PUBLICATIONS

International Search Report and Written Opinion for PCT Patent Application No. PCT/US2017/046494, dated Oct. 12, 2017, 14 pages.
Boll, Steven F., "Suppression of Acoustic Noise in Speech Using Spectral Subtraction", IEEE Transactions on Acoustics, Speech and Signal Processing, vol. ASSP-27, No. 2, Apr. 1979, pp. 113-119.
Written Opinion for International Application No. PCT/US2017/046494, dated Jul. 9, 2018, 9 pages.

* cited by examiner

GESTURE-ACTIVATED REMOTE CONTROL

TECHNICAL FIELD

This description relates to a remote control.

BACKGROUND

People typically watch television with a remote control nearby to control various aspects of the television (e.g., channel, volume, device displayed, etc.). Some remote controls are embedded in electronic devices such as laptop computers or tablet computers. Such remote controls may be realized as software that runs on these electronic devices that allows a user to control the television via standard input (e.g., keyboard and mouse/trackpad).

SUMMARY

In one general aspect, a method can include receiving a video stream from a camera of a first electronic device, the camera being aimed in the direction of a user of the first electronic device, the first electronic device being located apart from and within a vicinity of a second electronic device, the second electronic device being configured to produce sensory output. The method can also include detecting, over a set of frames of the video stream, a gesture made by the user. The method can further include, in response to detecting the gesture, activating a remote control within the first electronic device to transition the remote control to an active state from an inactive state, the remote control being configured to trigger changes to the sensory output produced by the second electronic device while the remote control is in the active state.

The details of one or more implementations are set forth in the accompanying drawings and the description below. Other features will be apparent from the description and drawings, and from the claims.

DETAILED DESCRIPTION

In many situations, a user is multitasking and performing some other task while watching television. In that case, the user would have to interrupt the other task in order to access the remote control software.

In accordance with the implementations described herein, a gesture-based control for a television is provided that runs in the background of a computing device remote from the television, where the control is activated by a gesture. Advantageously, the user need not interrupt any task in order to control the television. The gesture based control can be configured to activate a voice control that will run robustly even in the presence of noise and competing voices emanating from the television.

Figure 1:
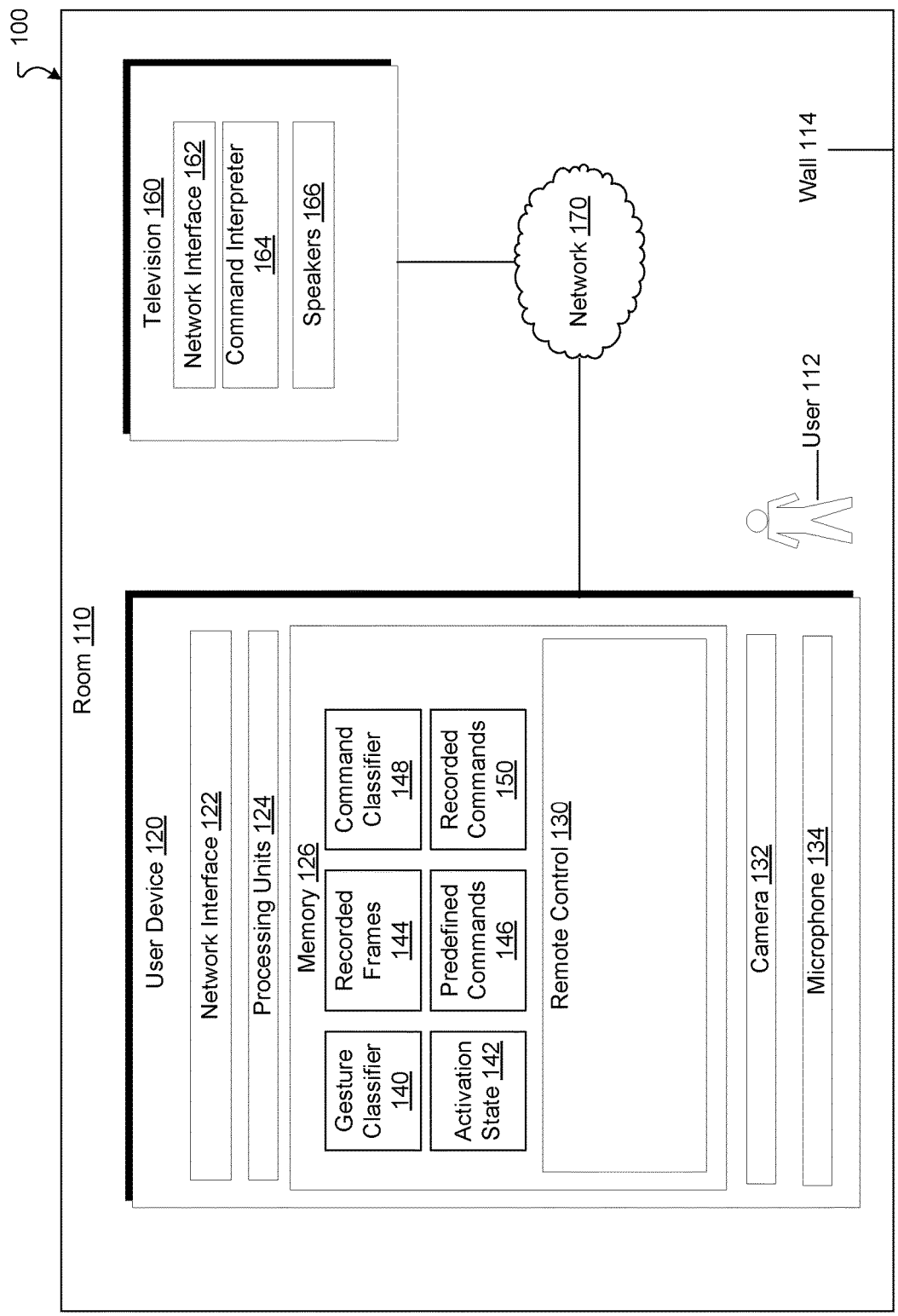
FIG. 1 is a diagram that illustrates an example electronic environment in which a gesture-based remote control may be implemented.

FIG. 1 is a diagram that illustrates an example electronic environment 100 in which the above-described gesture-based remote control may be implemented. As shown, in FIG. 1, the electronic environment 100 includes a room 110, a user device 120, a television 160, and a network 170.

The room 110 can be any room containing at least a portion of a wall 114 or some other obstruction off of which sound waves may reflect. The room 110 contains both the user device 120 and the television 160. However, in some implementations, the room 110 may not have walls and may be better described as an open area.

The user device 120 is configured to control the television 160 over the network 170 while also running any number of applications for use by the user 112. In some implementations, the user device 120 may be a laptop computer but can also be a desktop computer, a tablet computer, a smartphone, or the like. The user device 120 is also configured to run a remote control application in the background that is activated by one or more gestures made by the user 112.

The user device 120 includes a network interface 122, one or more processing units 124, memory 126, a camera 132, and a microphone 134. As illustrated in FIG. 1, the memory 126 is configured to store various data, including a gesture classifier 140 an activation state 142, recorded frames 144, predefined commands 146, a command classifier 148, and recorded commands 150.

The remote control 130 is configured to trigger changes to sensory output produced by the television 160. For example, the sensory output produced changed by the remote control 130 can include powering the television 160 on or off, increasing or decreasing volume of the sound output by the television 160, changing a station broadcasting content that is output by the television 160, etc. The remote control 130 is further configured to trigger such changes when the remote control 130 is in an active state and not trigger the changes in an inactive state.

The remote control 130 toggles between an active state and an inactive state through a gesture made by the user 112. For example, suppose that the remote control 130 is voice-controlled. Then a gesture the user 112 can make would take the form of a first moved toward the mouth of the user 112 (i.e., to simulate a microphone in which the user 112 speaks).

The gesture classifier 140 is configured to classify the recorded frames 144 as a trigger gesture or not a trigger gesture. The gesture classifier 140 may be configured using a machine learning process.

The activation state 142 is a binary value indicating whether the remote control 130 is in an active ("ACTIVE") or an inactive ("INACTIVE") state.

The recorded frames 144 are a set of frames recorded by the camera 132 that contain images of the user 112. These frames typically are the most recent frames recorded, e.g., over a window of time equal to 10 seconds. These frames are then classified as containing a trigger gesture or not containing a trigger gesture by the gesture classifier 140. When the user device 120 deems there to be a trigger gesture, the user device 120 sets the activation state 142 to ACTIVE. When the user device 120 deems there to not be a trigger gesture, the user device 120 sets the activation state 142 to INACTIVE. Thus, in an implementation, if the user 112 removes his or her first from his or her mouth, then the user device sets the activation state to INACTIVE.

The predefined commands 146 are configured to provide a definition of the commands that trigger the changes to the output of the television 160. Examples of predefined commands include "POWER ON," "POWER OFF," "INCREMENT VOLUME," "DECREMENT VOLUME," "INCREMENT STATION NUMBER," and "DECREMENT STATION NUMBER." Such commands 146 are configured to be transmitted to the television over the network 170 in a form that can be processed by (e.g., recognizable) to the television.

The command classifier 148 is configured to classify communications from the user 112 into a predefined command. For example, when the remote control 130 is voice-operated, then the user input may take the form of recorded speech or a frequency spectrum of that speech. In that case, each voice command may be parsed or classified into a particular command. Along these lines, the command classifier 148 may classify a voice command "Louder" as the command INCREMENT VOLUME, and so on.

The recorded commands 150 represent the most recent user-provided commands. In the above example, these commands 150 may take the form of recorded speech or a frequency spectrum thereof.

The camera 132 is configured to record gestures made by the user 112. The microphone 134 is configured to record voice commands made by the user 112 when the remote control 130 uses voice commands.

The television 160 is configured to provide video and audio output from one of any number of channels (e.g., stations) to the user 112. The television 160 includes a network interface 162 (which may be similar to the network interface 122), a command interpreter 164, and speakers 166.

The command interpreter 164 is configured to take commands received via the network interface 162 and process them to cause a physical effect on the television 160. For example, when the command INCREMENT VOLUME is received over the network interface 162, the command interpreter 164 increases the volume of the television by a fixed amount, e.g., a fixed amount of decibels.

The speakers 166 are configured to transmit audio produced by the television 160 over the air through the room 114 for the user 112. The speakers 166 have a known response to electrical input that produces a characteristic spectrum of sounds. Further, the speakers 166 are some (unknown) distance from the user device 120.

The network 170 is configured and arranged to provide network connections between the user device 120 and the television 160. The network 170 may implement any of a variety of protocols and topologies that are in common use for communication over the Internet or other networks. Further, the network 170 may include various components (e.g., cables, switches/routers, gateways/bridges, etc.) that are used in such communications.

The network interface 122 includes, for example, Ethernet adaptors, Token Ring adaptors, and the like, for converting electronic and/or optical signals received from the network 170 to electronic form for use by the user device 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

The components (e.g., modules, processing units 124) of the user device 120 can be configured to operate based on one or more platforms (e.g., one or more similar or different platforms) that can include one or more types of hardware, software, firmware, operating systems, runtime libraries, and/or so forth. In some implementations, the components of the user device 120 can be configured to operate within a cluster of devices (e.g., a server farm). In such an implementation, the functionality and processing of the components of the user device 120 can be distributed to several devices of the cluster of devices.

The components of the user device 120 can be, or can include, any type of hardware and/or software configured to process attributes. In some implementations, one or more portions of the components shown in the components of the user device 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the user device 120 can be, or can include, a software module configured for execution by at least one processor (not shown). In some implementations, the functionality of the components can be included in different modules and/or different components than those shown in FIG. 1.

Although not shown, in some implementations, the components of the user device 120 (or portions thereof) can be configured to operate within, for example, a data center (e.g., a cloud computing environment), a computer system, one or more server/host devices, and/or so forth. In some implementations, the components of the user device 120 (or portions thereof) can be configured to operate within a network. Thus, the components of the user device 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the user device 120 can be, or can include, processors configured to process instructions stored in a memory. For example, a remote control 130 (and/or a portion thereof) can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the user device 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the user device 120.

Figure 2:
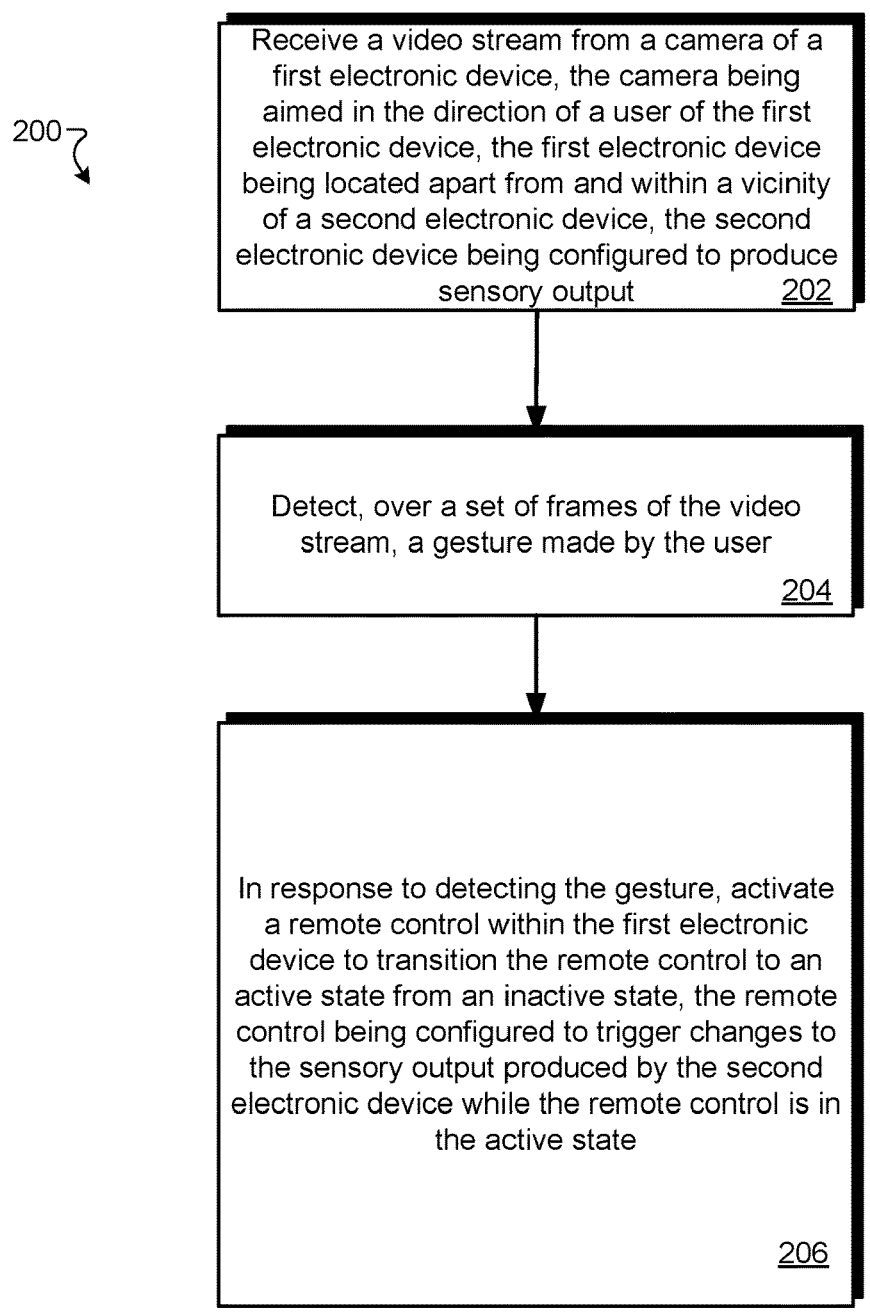
FIG. 2 is a flow chart that illustrates an example method of implementing the gesture-based remote control shown in FIG. 1.

FIG. 2 is a flow chart that illustrates a method 200 of implementing the gesture-based remote control shown in FIG. 1. The method 200 may be performed by software constructs described in connection with FIG. 1, which reside in memory 126 of the user device 120 and are run by the set of processing units 124.

At 202, a first electronic device receives a video stream from a camera of the first electronic device, the camera being aimed (e.g., targeted) in the direction of a user of the first electronic device, the first electronic device being located apart from and within a vicinity of a second electronic device, the second electronic device being configured to produce sensory output. For example, the user device 120 has a camera 132 to record gestures made by the user 112. The camera 132 records images of these gestures in frames of a video stream received by the user device 120.

At 204, the first electronic device detects a gesture made by the user over a set of frames of the video stream. If the gesture classifier 140 classifies the gesture as an activation gesture, then the user device 120 determines that the user made an activation gesture.

At 206, in response to detecting the gesture, the first electronic device activates a remote control within the first electronic device to transition the remote control to an active state from an inactive state, the remote control being configured to trigger changes to the sensory output produced by the second electronic device while the remote control is in the active state. Along these lines, the user device 120 sets the activation state 120 to ACTIVE upon detecting the gesture (e.g., the user putting his or her first to his or her mouth). The remote control 130 is then ready to transmit commands to the television when the user issues voice commands. Details of how the remote control converts voice commands to commands recognized by the television 160 are discussed with regard to FIGS. 3 and 4.

Figure 3:
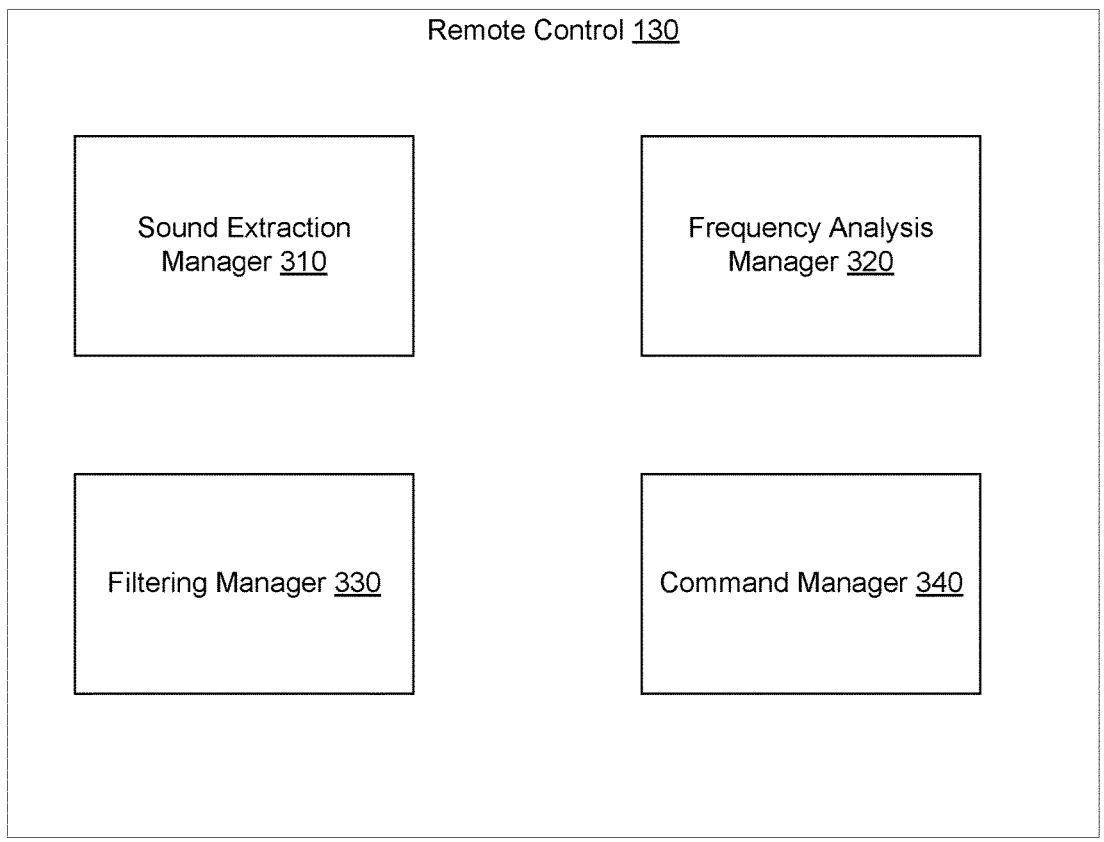
FIG. 3 is a diagram that illustrates an example remote control shown in FIG. 1.

FIG. 3 is a diagram that illustrates an example remote control 130. As shown in FIG. 3, the remote control 130 includes a number of components configured to convert sounds recorded in the microphone 134 (FIG. 1) to commands recognized by the television 160: a sound extraction manager 310, a frequency analysis manager 320, a filtering manager 330, and a command manager 340.

The sound extraction manager 310 is configured to acquire sounds from the microphone 134. It should be noted that the sounds so acquired by the sound extraction manager 310 are not necessarily pure speech spoken by the user 112. Rather, the sounds may also include spoken words emitted from the speaker 166 of the television 160 as well as noise emitted from the room 110 (e.g., reflections off the wall 114 and low-frequency noise from heating, cooling, and electrical devices in the room 110).

Thus, the remote control 310 is configured to isolate the speech spoken by the user 112 so that the remote control 130 may accurately transmit commands to the television 160. One way to perform such isolation is to perform a frequency analysis of the acquired sound and filter out those frequencies that are known to not be part of the speech of the user 112.

The frequency analysis manager 320 is configured to generate a frequency spectrum from the sound acquired by the sound extraction manager 310. In one implementation, the frequency analysis manager 320 is configured to generate the frequency spectrum by performing successive Fourier transformations (e.g., via a fast Fourier transform) of time-windows of the acquired sound. For example, the frequency analysis manager 320 may break a 20-second segment of sound into four, five-second segments. In that case, the frequency analysis manager 320 would then perform a Fourier transformation on each five-second segment to create four frequency spectra. The frequency analysis manager 320 may then arrange these four frequency spectra in order by time to create a spectrogram that represents the frequency spectrum of the acquired sound as a function of time.

It should be noted that, in other implementations, the frequency analysis manager 320 may be configured to generate a spectrogram using transformations other than Fourier transformations, e.g., certain types of wavelet transformations. In some cases, such wavelet transformations may provide a more compact representation of the frequency spectra than a Fourier transformation.

The filtering manager 330 is configured to suppress those frequency components that are not part of any speech provided by the user 112. Along these lines, the filtering manager 330 determines the frequencies present in the room without the speech of the user 112 and then suppresses those frequencies from the spectrogram generated by the frequency analysis manager 320. Although further details of how the filtering manager 330 determines such frequencies are provided with regard to FIG. 4, some detail is provided here.

The television 160, via speakers 166, outputs sound from a location separate from the user device 120. The filtering manager 330 may then determine the distance between the television 160 or the speakers 166 and the user device 120 by determining a roundtrip time (RTT) for a data packet sent via a direct connection between the television 160 and the user device 120. Further, the filtering manager 330 may also determine an angle of arrival/angle of departure to determine coordinates of the location of the speakers relative to the user device 120. From these coordinates, the filtering manager 330 may determine the phase of certain frequency components. Frequency components having such a phase as determined by the placement of the speakers 166 relative to the user device 120 may be suppressed as having been generated by the television 160 and not the user 112.

Further, the filtering manager 330 may filter out low frequency hum (e.g., 60 Hz) from the room 110, e.g., electrical, cooling, and heating systems. Nevertheless, care must be taken because some human speech has frequencies lower than 60 Hz. In this case, however, because the hum is roughly constant over time, low-frequency spikes in the spectrogram that are constant over time may be suppressed.

The command manager 340 is configured to parse the filtered spectrogram into a command or set of commands to be classified by the command classifier 148. Along these lines, the command manager 340 classifies the spectrogram as corresponding to a particular command. In some implementations, the command manager 340 performs an inverse Fourier transformation to recover the speech from the user 112 prior to performing the mapping.

Figure 4:
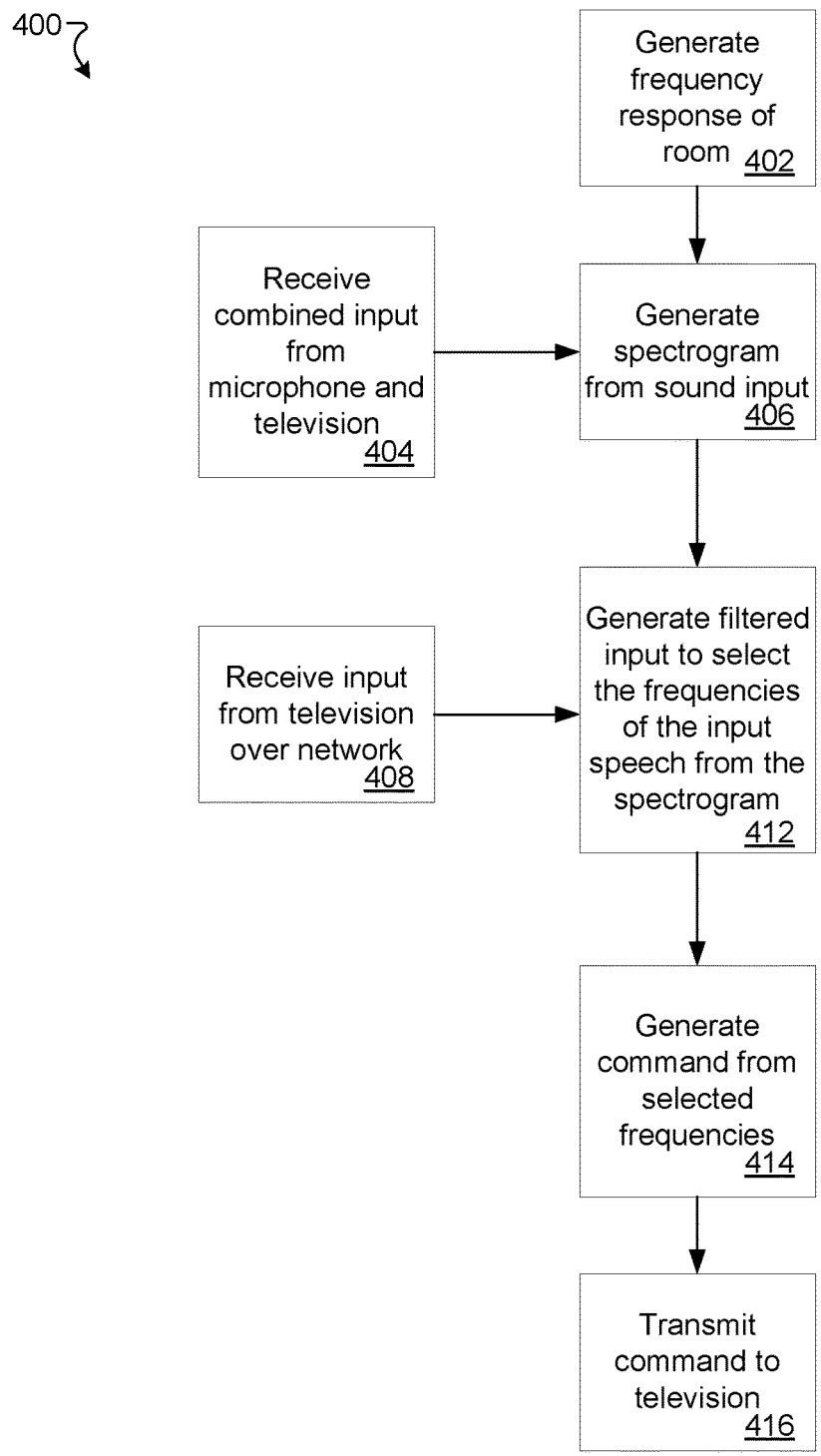
FIG. 4 is a flow chart that illustrates an example process of using voice-based commands in the remote control shown in FIG. 1.

FIG. 4 is a flow chart that illustrates a process 400 of using voice-based commands in the remote control 130. The process 400 may be performed by software constructs described in connection with FIG. 3, which reside in memory 126 of the user device 120 and are run by the set of processing units 124.

At 402, the user device 120 generates a frequency response of the room 110. The frequency response includes an amplitude and phase at each frequency of the sound generated by the television 160. In one alternative implementation, one may obtain the frequency response of the room by performing a frequency sweep (e.g., chirp) upon establishing a connection over the network and then measuring the received signal. In another alternative implementation, one samples frequencies as they are produced by the television 160 while the remote control 130 is in the INACTIVE state. In this case, to address privacy concerns, a continuous recording is not required: since the signal to be produced ahead of time is known, the user device 120 can record only when an unobserved frequency is going to be played.

At 404, the user device 120 receives combined sound input from the microphone 134. Again, the sound input includes sounds from the speech of the user 112 combined with sounds from the television 160 as well as noise from the room 110.

At 406, the user device 120 generates a spectrogram—a frequency spectrum over successive time windows—from the combined sound input.

At 408, the user device 120 receives sound input from the television 160 over the network 170. Note that the sound input received over the network 170 is not the same as the sound received over the air in the room 110 because the latter includes distortion and noise from the room 110. It should be appreciated that the user device 120 may measure the roundtrip time (RTT) and angle of arrival (AoA) or angle of departure (AoD) of WiFi signals of the network 170 over which signals from the television 160 are transported in order to approximate the amplitude and phase of such signals. In some cases, such phase may be needed to differentiate human voices in sound from the television 160 from the human speech of the user 112.

At 412, the user device 120 filters the noise in the sound received over the air in the room from the combined sound input using the frequency response and, in doing so, selects the frequencies corresponding to the speech from the spectrogram. In one implementation, the user device 120 subtracts the frequency response-filtered frequencies from each window of the spectrogram.

At 414, the user device 120 generates a command from the selected frequencies of the spectrogram.

At 416, the user device 120 transmits the command to the television 160 over the network 170.

The above process 400 assumes that the television 160 produces sound via the speakers 166 while the user 112 speaks a command. A simplified process would involve sending a mute command to the television 160 when the remote control is in an ACTIVE state. In another implementation, the process may involve sending a volume down command rather than a mute command. Such a volume down command may provide a smoother user experience.

Alternatively, when the user device 120 is a smartphone, tablet computer, or other lightweight device, the remote control 130 may be operated via movements of the user device 120. In such a case, the user device 120 may have an accelerometer that measures such movements. The user device 120 may then map such movements to commands that the remote control 130 would send to the television 160.

Figure 5:
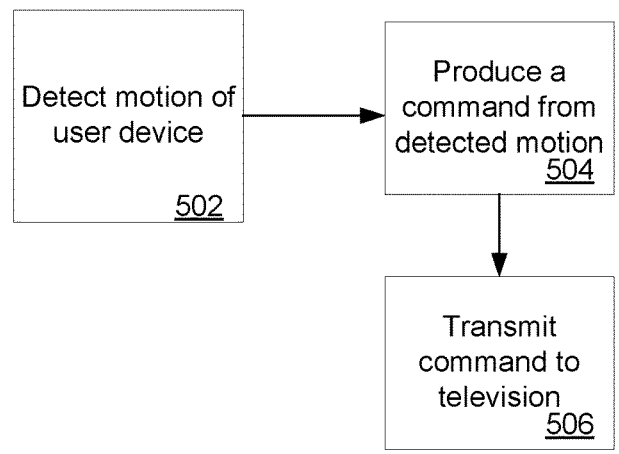
FIG. 5 is a flow chart that illustrates an example process of using gesture-based commands in the remote control shown in FIG. 1.

FIG. 5 is a flow chart that illustrates a process 500 of using gesture-based commands in the remote control 130. The process 500 may be performed by software constructs described in connection with FIG. 3, which reside in memory 126 of the user device 120 and are run by the set of processing units 124.

At 502, the user device 120 detects a motion of the user device 120 while the remote control 130 is in the ACTIVE state. For example, in one implementation, the user 112 moves the user device 112 in an upward direction so that the volume of the television 160 is incremented.

At 504, the user device 120 classifies the detected motion to produce a command via the parser/classifier 148. To continue the above example, the upward motion of the user device 120 is classified as the INCREMENT VOLUME command via the command classifier 148.

At 506, the user device 120 transmits the command to the television 160 via the network 170.

Figure 6:
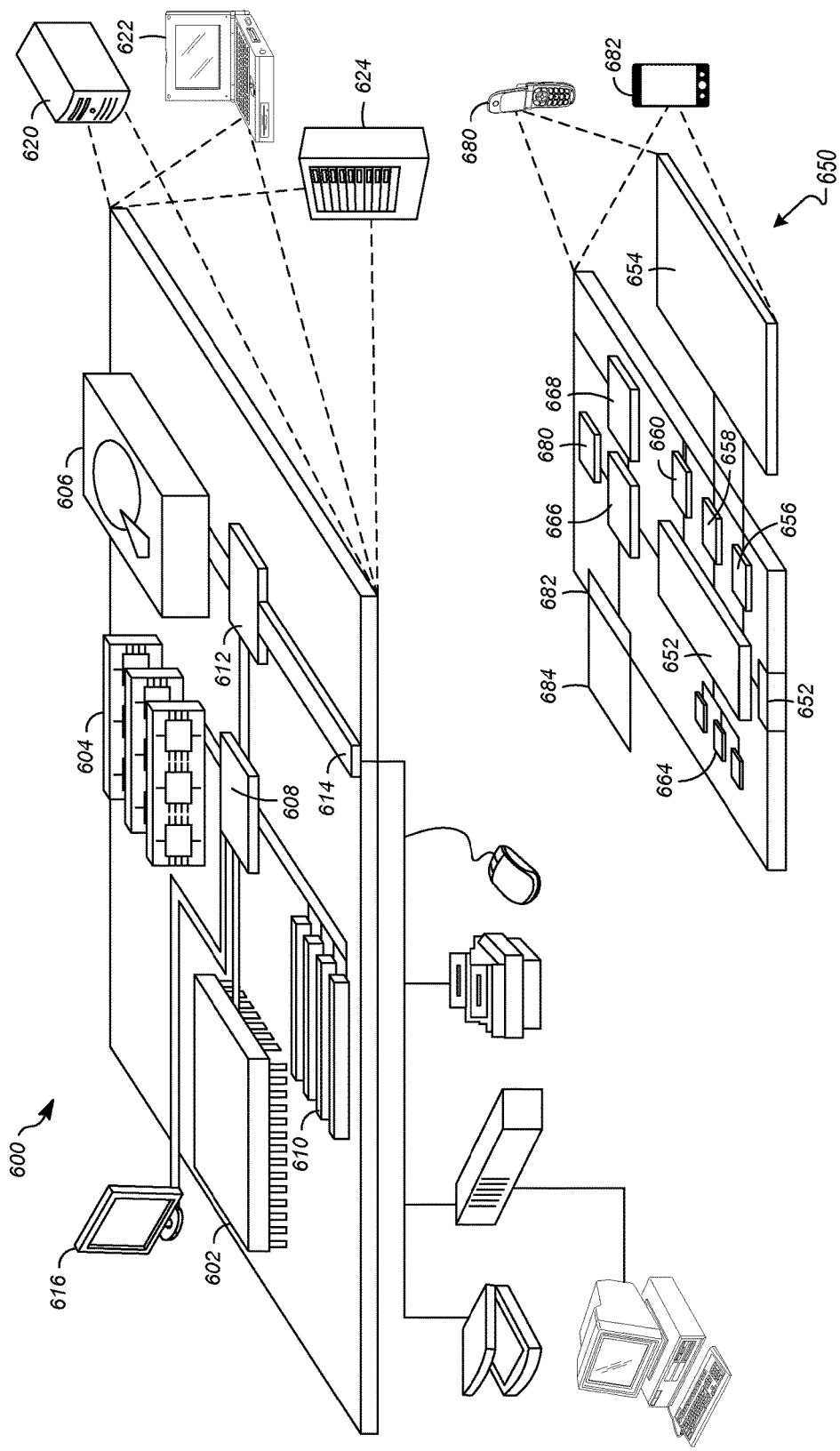
FIG. 6 illustrates an example of a computer device and a mobile computer device that can be used with circuits described here.

FIG. 6 illustrates an example of a generic computer device 600 and a generic mobile computer device 650, which may be used with the techniques described here.

As shown in FIG. 6, computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 500, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 506 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer program product comprising a non-transitory storage medium, the storage medium storing code that, when executed by processing circuitry, causes the processing circuitry to perform a method, the method comprising:
   receiving a video stream from a camera of a first electronic device that includes the processing circuitry, the camera being aimed in a direction of a user of the first electronic device, the first electronic device being located apart from and within a vicinity of a second electronic device, the second electronic device being configured to produce sound output;
   detecting, over a set of frames of the video stream, a gesture made by the user;
   in response to detecting the gesture:
      activating a remote control within the first electronic device to transition the remote control to an active state from an inactive state, the remote control being configured to trigger changes to the sound output produced by the second electronic device while the remote control is in the active state;
   receiving sound data converted from sound waves;
   in response to the remote control being in the active state, identifying the sound data as a predefined command based on a distance between the first electronic device and the second electronic device and an angle of arrival (AOA) of a network signal over which the sound output from the second electronic device is transported to make a change to the sound output of the second electronic device, the distance being determined by generating a roundtrip time for a data packet sent via connection between the first electronic device and the second electronic device; and
   in response to the gesture not being made by the user when the remote control is in the active state, deactivating the remote control to transition the remote control to the inactive state.

2. The computer program product as in claim 1, wherein the first electronic device further includes a microphone configured to convert sound waves incident on the microphone into sound data stored in a memory of the first electronic device, and wherein in response to the remote control being in the active state, the method further comprises:

converting the sound data to remote control data that, when received by the second electronic device, causes the second electronic device to trigger the changes to the sound output produced by the second electronic device; and transmitting the remote control data to the second electronic device.

3. The computer program product as in claim 1, wherein the sound output produced by the second electronic device includes vocalized sounds;

wherein identifying the sound data as the predefined command to make the change to the sound output of the second electronic device includes performing a filtering operation, the filtering operation being configured to filter the vocalized sounds from the sound waves incident on the microphone.

4. The computer program product as in claim 3, wherein performing the filtering operation includes:

in response to the remote control transitioning to the active state, transmitting a volume down command to the second electronic device, the volume down command, when received by the second electronic device, causes the second electronic device to produce the vocalized sounds at smaller amplitudes.

5. The computer program product as in claim 3, wherein the method further comprises obtaining a set of frequencies of the vocalized sounds produced by the second electronic device, and wherein performing the filtering operation includes:

obtaining a set of frequencies of the sound data input into the microphone;

suppressing the frequencies of the set of frequencies of the vocalized sounds produced by the second electronic device from the set of frequencies of the sound data to form a set of filtered frequencies; and forming, from the set of filtered frequencies, filtered sound data from which the remote control data is produced.

6. The computer program product as in claim 5, wherein obtaining the set of frequencies of the sound data input into the microphone includes:

recording the sound data input for a specified amount of time to generate a time window of sound;

obtaining a set of frequencies from the time window of sound to form a time window of frequencies;

repeating the recording of sound data for the specified amount of time and obtaining a set of frequencies while the remote control is in the active state to form a spectrogram of the recorded sound data.

7. The computer program product as in claim 5, wherein obtaining the set of frequencies of the sound data input into the microphone includes performing a Fourier transform operation on the sound data input into the microphone.

8. The computer program product as in claim 5, wherein suppressing the frequencies of the set of frequencies of the vocalized sounds produced by the second electronic device includes:

determining the angle of arrival (AOA) of the network signal over which the vocalized sound from the second electronic device is transported;

based on the AOA, producing an amplitude and phase of the frequencies of the set of frequencies of the vocalized sounds produced by the second electronic device; and identifying those frequencies of the set of frequencies of the sound data input having an amplitude and phase sufficiently close to the amplitude and phase of the frequencies of the set of frequencies of the vocalized sounds produced by the second electronic device.

9. The computer program product as in claim 3, wherein the filtering operation is further configured to filter audio noise produced by a room in which the first electronic device and the second electronic device are located from the sound waves incident on the microphone.

10. The computer program product as in claim 9, wherein performing the filtering operation includes filtering frequencies less than a noise frequency threshold from the sound data input into the microphone.

11. The computer program product as in claim 1, wherein receiving the sound data converted from the sound waves includes:

recording the sound data for a specified amount of time to generate a time window of sound;

obtaining a set of frequencies from the time window of sound to form a time window of frequencies; and repeating the recording of sound data for the specified amount of time and obtaining a set of frequencies while the remote control is in the active state to form a spectrogram of the sound data, the identification of the sound data as a predefined command being based on the spectrogram of the sound data.

12. The computer program product as in claim 1, wherein the sound data includes a set of frequencies, and wherein identifying the sound data as a predefined command to make a change to the sound output of the second electronic device includes:

based on the distance, producing an amplitude and phase of the frequencies of the set of frequencies of the vocalized sound produced by the second electronic device; and identifying those frequencies of the set of frequencies of the sound data having an amplitude and phase sufficiently close to the amplitude and phase of the frequencies of the set of frequencies of the vocalized sound produced by the second electronic device.

13. A method, comprising:

receiving, by processing circuitry of a first electronic device, a video stream from a camera of the first electronic device, the camera being aimed in a direction of a user of the first electronic device, the first electronic device being located apart from and within a vicinity of a second electronic device, the second electronic device being configured to produce sound output;

detecting, by the processing circuitry and over a set of frames of the video stream, a gesture made by the user; and in response to detecting the gesture:

activating, by the processing circuitry, a remote control within the first electronic device to transition the remote control to an active state from an inactive state, the remote control being configured to trigger changes to the sound output produced by the second electronic device while the remote control is in the active state;

receiving, by the processing circuitry, sound data converted from sound waves;

in response to the remote control being in the active state, identifying the sound data as a predefined command based on a distance between the first electronic device and the second electronic device and an angle of arrival (AOA) of a network signal over which the sound output from the second electronic device is transported to make a change to the sound output of the second electronic device, the distance being determined by generating a roundtrip time for a data packet sent via connection between the first electronic device and the second electronic device; and in response to the gesture not being made by the user when the remote control is in the active state, deactivating, by the processing circuitry, the remote control to transition the remote control to the inactive state.

14. The method as in claim 13, wherein the first electronic device further includes a microphone configured to convert sound waves incident on the microphone into sound data stored in a memory of the first electronic device, and wherein, in response to the remote control being in the active state, the method further comprises: converting the sound data to remote control data that, when received by the second electronic device, causes the second electronic device to trigger the changes to the sound output produced by the second electronic device; and transmitting the remote control data to the second electronic device.

15. The method as in claim 13, wherein the sound output produced by the second electronic device includes vocalized sounds; wherein identifying the sound data as the predefined command to make the change to the sound output of the second electronic device includes performing a filtering operation, the filtering operation being configured to filter the vocalized sounds from the sound waves incident on the microphone.

16. The method as in claim 15, wherein performing the filtering operation includes:
in response to the remote control transitioning to the active state, transmitting a volume down command to the second electronic device, the volume down command, when received by the second electronic device, causes the second electronic device to produce the vocalized sounds at smaller amplitudes.

17. The method as in claim 15, further comprising obtaining a set of frequencies of the vocalized sounds produced by the second electronic device, and
wherein performing the filtering operation includes:
obtaining a set of frequencies of the sound data input into the microphone;
suppressing the frequencies of the set of frequencies of the vocalized sounds produced by the second electronic device from the set of frequencies of the sound data to form a set of filtered frequencies; and
forming, from the set of filtered frequencies, filtered sound data from which the remote control data is produced.

18. A system, comprising:
a first electronic device and a second electronic device, the first electronic device being located apart from and within a vicinity of the second electronic device, the second electronic device being configured to produce sound output, the first electronic device including a network interface, a camera, memory, and processing circuitry coupled to the memory, the processing circuitry being configured to:
receive a video stream from the camera, the camera being aimed in a direction of a user of the first electronic device;
detect, over a set of frames of the video stream, a gesture made by the user; and
in response to detecting the gesture:
activate a remote control within the first electronic device to transition the remote control to an active state from an inactive state, the remote control being configured to trigger changes to the sound output produced by the second electronic device while the remote control is in the active state;
receiving sound data converted from sound waves; and
in response to the remote control being in the active state, identifying the sound data as a predefined command based on a distance between the first electronic device and the second electronic device and an angle of arrival (AOA) of a network signal over which the sound output from the second electronic device is transported to make a change to the sound output of the second electronic device, the distance being determined by generating a roundtrip time for a data packet sent via connection between the first electronic device and the second electronic device; and
in response to the gesture not being made by the user when the remote control is in the active state, deactivating the remote control to transition the remote control to the inactive state.

* * * * *